No. 852,104. PATENTED APR. 30, 1907.
E. F. CLARK & T. C. POOLE.
APPARATUS FOR MAKING CARPETS AND THE LIKE.
APPLICATION FILED MAY 29, 1905.
4 SHEETS—SHEET 1.
Fig. 1.
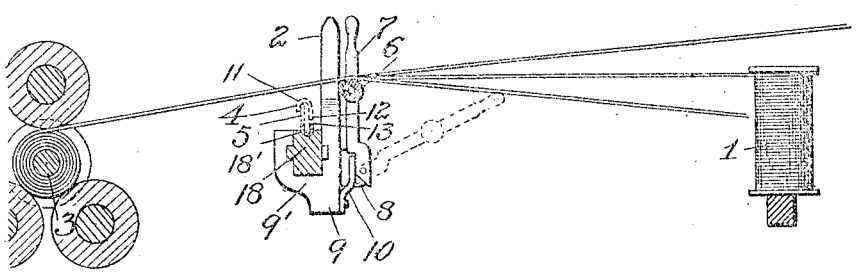
Fig. 2.
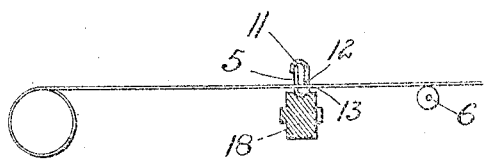
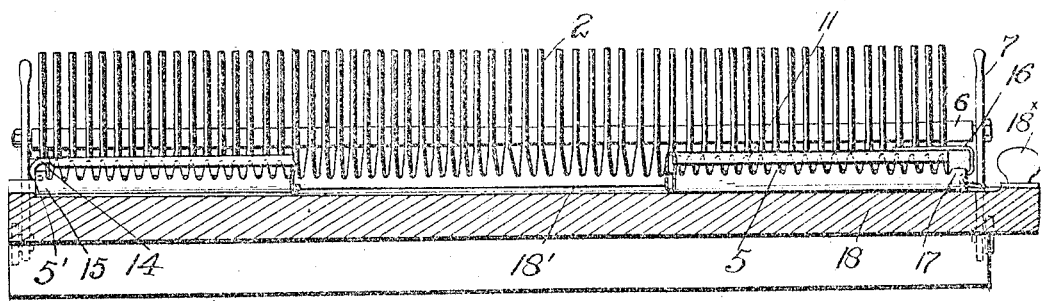
Fig. 3.
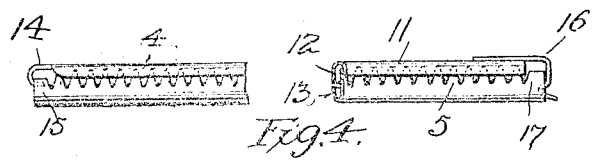
Fig. 4.
Attest
Edward N. Sarton
C. S. Middleton
Inventors
Eugene F. Clark
Thos. C. Poole
by Spear, Middleton, Donaldson & Spear
Attys.

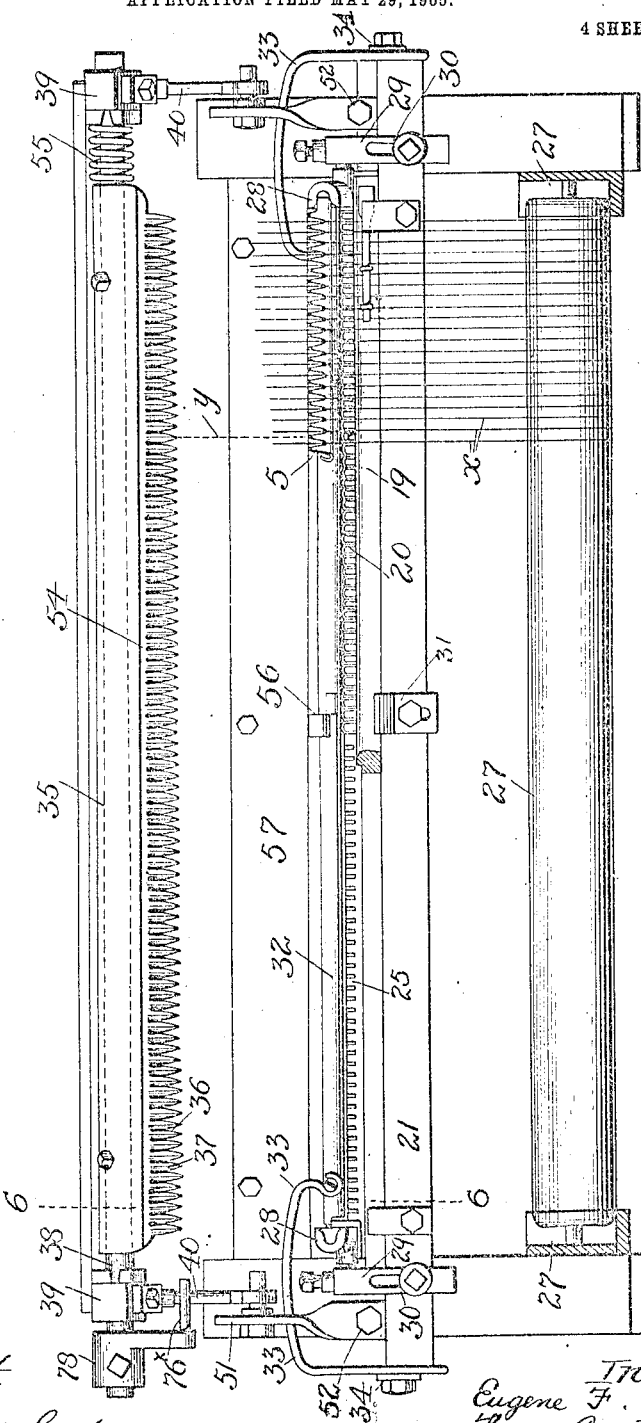

No. 852,104. PATENTED APR. 30, 1907.
E. F. CLARK & T. C. POOLE.
APPARATUS FOR MAKING CARPETS AND THE LIKE.
APPLICATION FILED MAY 29, 1905.
4 SHEETS—SHEET 3.
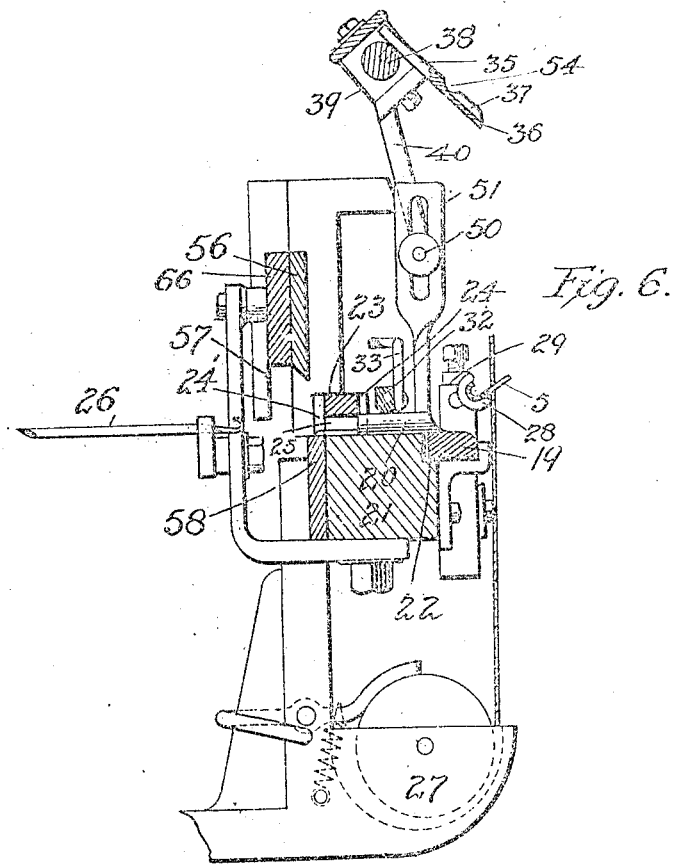
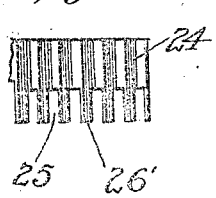
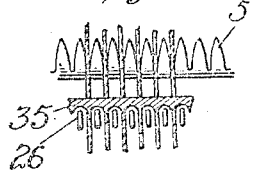
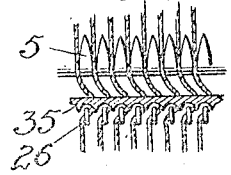

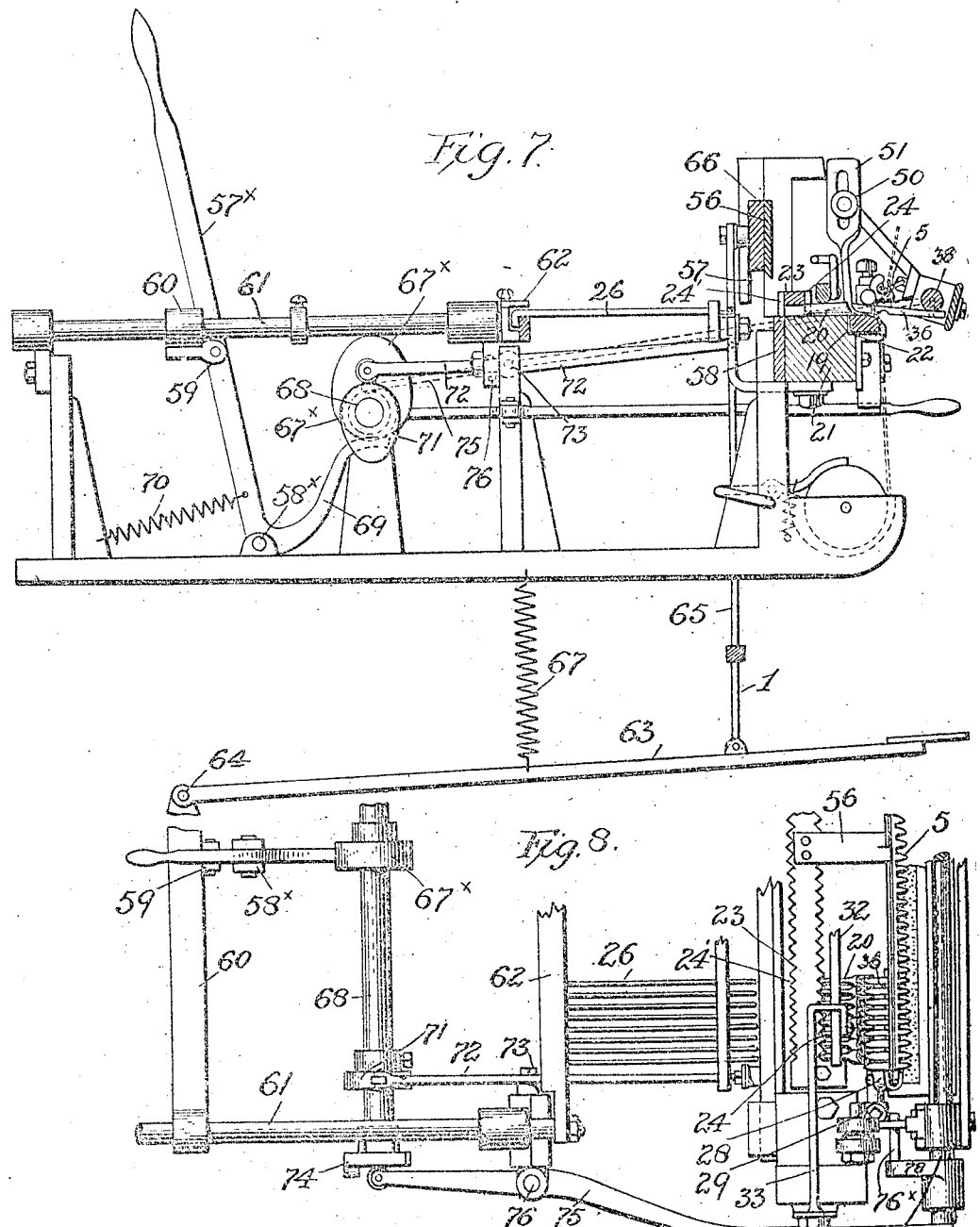

UNITED STATES PATENT OFFICE.

EUGENE F. CLARK AND THOMAS C. POOLE, OF PHILADELPHIA, PENNSYLVANIA.

APPARATUS FOR MAKING CARPETS AND THE LIKE.

No. 852,104.　　　Specification of Letters Patent.　　　Patented April 30, 1907.

Application filed May 29, 1905. Serial No. 262,937.

*To all whom it may concern:*

Be it known that we, EUGENE F. CLARK and THOMAS C. POOLE, citizens of the United States, residing at Philadelphia, Pennsylvania, have invented certain new and useful Improvements in Apparatus for Making Carpets and the Like, of which the following is a specification.

Our invention relates to the manufacture of carpets and we have disclosed it herein as applied to the manufacture of "Royal Axminster" though we do not wish to limit all features of our invention to the manufacture of this particular class of goods.
Our object primarily is to provide means whereby the perfect lining up of the colors in the completed article will be insured the relative position of the different colors of yarn as they leave the bobbins according to the pattern desired being maintained throughout all the subsequent steps of the manufacture, and particularly while being threaded through the guide tubes of the spool carrying frames.
Heretofore it has been the practice to spool the yarns and then the spool bearing different colors of yarns is placed in a spool frame and this is then arranged in a threading machine having a single reciprocating needle.
The spool frame is given a step by step movement longitudinally to bring its guide tubes in succession in front of the reciprocating needle and this having advanced through the first guide tube in the row is supplied with the first strand of yarn at the end of the spool by the operative who picks up this strand and lays it across the stem of the needle to be taken by the stem of the hook. The needle then retracts and threads the yarn through the guide tube. The spool frame then moves to bring the next tube in the row opposite the single needle and it then advances therethrough. The next yarn is taken by the operative and engaged with this needle which retracts as before and threads this yarn through the second tube and this operation is repeated until all the yarns on the spool are threaded through their appropriate guide tubes, which is carried by the spool frame.

A spool frame with its guide tubes of substantially the form mentioned above is disclosed in Letters Patent of the United States No. 783,277, granted February 21, 1905 to
J. P. Humphries. The manner in which these spool frames with their guide tubes and the spools carried by said frames are employed in the loom is well understood by those skilled in the art, but reference may be made as showing the style of machine, to Letters Patent of the United States No. 571,418 granted November 17, 1896 to E. Tymeson.

In the threading operation above described there is no assurance that the pattern will be accurate because of the liability of an operative through lack of skill or through carelessness to take up a yarn out of its order and engage it with the single threading needle so that while it has been properly spooled according to the pattern it has been incorrectly threaded through the guide of the spool frame. This defective threading frequently occurs as the yarns lie close together, and it is difficult for the operative to separate the yarns and pick them up in their proper order to be engaged with the threading needle. Further than this, the threading proceeds, one yarn at a time, and a considerable time is necessary in threading a whole spool.

It is a further object of our invention to avoid the single threading operation and to thread all the yarns carried by the one spool through the guide tubes of the frame carrying the said spool at one operation.

It is a further object of our invention to provide a trimming or cutter means in connection with the threading machine so that as soon as the yarns have all been threaded through the guide tubes they may at once be trimmed, thus dispensing with a separate trimming machine.

Further objects of our invention will appear hereinafter.

The invention consists in the features and combination and arrangement of parts hereinafter described and particularly pointed out in the claims.

In the accompanying drawings, Figure 1 is a central vertical sectional view from front to rear through a part of the spooling machine with our improvements applied thereto, part of the figure being in the nature of a diagram, for convenience of illustration. Fig. 2 is a similar view of Fig. 1 with parts in a different position. Fig. 3 is a front view of the guiding comb and transfer guide shown in Fig. 1, the support being shown in section.

Fig. 4 is a detail view of the transfer or alining guide. Fig. 5 is a front view of the threading machine. Fig. 6 is a detail view in vertical section of a part of the threading machine, this section being taken at the left of Fig. 5 on the line 6—6, the section being also through the spool carrying frame and the parts associated therewith, but which for convenience are shown only at the right of said Fig. 5. Fig. 7 is a view similar to Fig. 6 with the parts in a different position and with some of the parts omitted. Fig. 8 is a plan view of one end of the threading machine. Fig. 9 is a detail view of the needle and guide tube registering bar. Fig. 10 is a detail view of the needles, the shifting bar and the alining comb, and Fig. 11 is a view similar to Fig. 10 with the shifting bar shifted toward the right to lay the yarns across the needles.

Referring to Fig. 1 the different yarns extend from bobbin 1 to said yarns, being directed between the teeth of a comb 2 to the spool 3, upon which the said yarns are wound.

In the method of manufacture above referred to, after the yarns have been wound upon the spool they are cut from the main strand and these cut ends must then be picked up individually and threaded through the guide tubes by means of the reciprocating needle above mentioned. When brought to the threading machine the cut ends are loose and are liable to be displaced in relation to each other and this, in connection with carelessness or lack of skill on the part of the operative will result frequently in the yarns being disordered when passed through the guide tubes, which of course will cause irregularities and imperfections to appear in the pattern. In order to insure the proper relative positions of the yarns during the threading operation, we employ means for holding the cut ends of the yarns as they are taken from the spooling machine and transferred to the threading machine and this means maintains control of the yarns and holds them in exactly the relation in which they were spooled and in accordance with the pattern desired, until they are taken by the needles to be threaded through the guide tubes of the spool carrying frame. This means consists of what we may term a transfer comb or alining guide 4, which is made up of a strip preferably of sheet metal and having teeth 5 extending vertically and directly in front of the teeth of the comb 2 as shown in Figs. 1 and 3, so that the yarns as they pass through the comb 2 will be in line with the space between the teeth 5. Immediately in rear of the comb 2 we arrange a roller 6 supported in arms 7, pivoted to ears 8 on the rear side of the comb bar 9. These arms 7 are held in either one of two positions shown in Fig. 1 by a spring or springs 10 bearing upon flat portions of the arms at their lower ends. In the position shown in Fig. 1 the roller 6 directs the yarns through the comb 2 in a plane above the teeth 5. When sufficient lengths of yarn have been spooled the arms 7 are thrown down to the position shown in dotted lines in Fig. 1, thus lowering the yarn into the space between the teeth 5 in the transfer comb and then a cap piece 11 is placed on the transfer guide forming a part thereof, the said cap piece clamping the yarns between its edge 12 and the edge 13 of guide 5. The cap piece or strip is held in place on the main portion of the guide by a hook 14 at one end engaging an eye 15 on the main portion and by a spring 16 at its other end engaging an eye 17 on the main portion of the guide, this construction permitting the cap piece or strip to be readily placed in position to clamp the yarns or quickly disengage from the main portion to release the said yarns. After the yarns have been lowered by the roller 6 into the transfer guide and clamped therein the spool 3 is removed from the spooling rollers and drawn to the left, the transfer guide of course being also removed from its support 18 to be carried away with the yarns clamped therein and then the yarns at the right of the said guide are attached to another spool which is now placed in the spooling rollers, and after this the yarns are severed at a point between the transfer or alining guide and the new spool. This leaves the alining guide attached to the free ends of the yarns with each yarn clamped in one of the spaces between the teeth of the said guide and thus positively held in the proper relation to all the other guides as called for by the pattern. The spool with the alining or transfer guide is now placed in the threading machine so that the yarns, while maintaining their relative positions accurately to aline with the other parts of the pattern may be threaded through the guides of the spool carrying frames. This spool carrying frame is indicated at 19 and the tubes carried thereby at 20. For the threading operation the spool carrying frame is placed on the bed 21 of the threading machine with the bar 19 resting on a shoulder 22 thereof and the tubes 20 extending over a horizontal surface of the said bed and with their ends registered in proper position by means of a registering bar 23 secured to the bed 21, the said bar having V shape grooves 24 extending vertically on its front side to receive and register the ends of the guide tube, and having also guide-ways 25 on its under side for the passage of the threading needles 26, which are arranged to pass through the said registering bar and through the guide tubes registered therewith.

As shown in Fig. 9 the partitions 26' between the passages 25 are beveled at 24' on their edges so as to properly direct the needles should any of them get slightly out of alinement with the guide tubes through which they must pass. The spool carrying the yarns is placed below the bed 21, being supported in boxes 27, and the transfer or alining guide attached to and properly spacing the threads of this spool is placed in holders 28 consisting of U shape sockets adapted to receive the end portions of the alining guide and hold the same with its teeth in slightly upward inclined position as shown in Figs. 6 and 7. The supports 28 are arranged at the ends of the threading machine as shown in Fig. 5, and are carried by vertically adjustable posts or brackets 29, held by a bolt and slot connection 30 to the bed 21.

In Fig. 5 we show at the right a portion of the alining guide and also a portion of the spool carrying frame with its guide tubes. It will be understood that during the threading operation the spool is not supported by the spool carrying frame, but the said frame is attached to the spool and carries the same through the loom, as shown in the patent of Tymeson above referred to. In Fig. 5 we have omitted the alining bar and the spool carrying frame from the left hand portion of the figure. The spool carrying frame is further held in position by a clip or bracket 31 adapted to engage the central portion thereof as shown in Fig. 5 by a presser bar 32 adapted to bear on the upper side of the guide tubes, the said presser bar being supported at its ends and pressed downwardly by springs 33 adjustably secured, as at 34, to the bed of the machine.

By reference to Fig. 5 it will be seen that the yarns indicated at x are held by the transfer or alining guide so that the needles when advanced through the guide tubes 20 of the spool carrying frame will pass between the said yarns, and in order that the yarns may engage the needles it is necessary to give the said yarns a lateral displacement to lay them across the stems of the needles in rear of the hooks. For this purpose we provide a shifting bar or comb 35 having teeth 36 of pointed shape and grooved as at 37 on their under sides. This shifting comb or bar is carried by a shaft or rod 38 arranged to slide and also to turn in boxes or bearings 39 carried by arms 40 pivotally supported at 50 from brackets 51, which in turn are supported by the bed 21, being bolted thereto at 52, Fig. 5. This shifting comb or bar, while the spool and the transfer or alining guide are being placed in position in the threading machine, is in its elevated position indicated in Fig. 6, but after the spool and the alining bar have been properly positioned the shifting bar or comb is lowered, as shown in Fig. 7, to pass beneath the alining bar and its teeth will engage the yarns and press them from the vertical position shown in Fig. 6 to the position shown in Fig. 7, one yarn lying in each of the spaces between the teeth of this comb. For this purpose of course, the teeth of the shifting comb are directly in alinement with the teeth of the alining guide. This is indicated in Fig. 5 by the dotted line y. After the yarns have been engaged by the teeth of the shifting comb the whole series of needles are advanced and they are guided through the passages 25, the guide tubes 20 and the under grooves 37 of the teeth of the shifting comb, the hook ends of the said needles when fully advanced occupying positions in the longitudinal grooves 54 of the shifting comb, the relation of the shifting comb the hook ends of the needles and the teeth of the transfer or alining guide and the yarns at this time is shown in Fig. 10, the needles extending through the spaces between the yarns. In order that the needles, when they retract, may engage the yarns the shifting comb bar 35 is given a shifting movement longitudinally and this may be performed simply by hand manipulation, by pressing upon the left hand end of the shaft 38, Fig. 5, so as to press the said bar to the right against the resistance of the spring 55. This will make the parts assume the position shown in Fig. 11, where it will be seen that the yarns are laid across the stem of the needles directly in rear of the hooks thereof, and these needles when they retract will carry the yarns with them, thus threading the same simultaneously through the guides 20 of the spool carrying frame. Before this threading action takes place however, the cap piece or strip 11 has been removed from the main part of the transfer or alining guide so that the free ends of the yarns will no longer be clamped by the said parts but will be free to be drawn through the guides 20 by the retraction of the needles.

After the needles have simultaneously threaded all of the yarns through the guide tubes the ends of the said yarns may be trimmed before removing the spool carrying frame with its guide from the threading machine. For this purpose we provide a knife 56 adapted to reciprocate in guideways 57 and coöperating with a fixed knife 58 secured to the bed 21. This knife trims the ends at the proper distance from the ends of the guide tubes and with little waste. After this operation has been performed the shifting comb may be raised to its elevated position, the transfer or alining guide removed from its supports and the spool carrying frame with its guides and the yarns threaded therethrough may be then removed from the machine together with the spool and these parts then placed in the loom for the weaving operation. We provide a suitable bracket or support as at 56 for the intermediate portion of the alining or transfer guide.

The various operations of the threading machine may be carried out by hand, or if desired automatic mechanism can be provided to operate the several parts. For operating the needles by hand we provide a lever 57× pivoted at 58× and connected at 59 with a cross bar 60 which is connected with the slide rods 61, only one of which is shown in the drawings, the said slide rods being connected with and operating the cross head 62 to which the whole series of threading needles is connected. For operating the trimming knife we may employ a foot lever 63 pivoted at 64 to any suitable frame part, the said foot lever being connected as shown at 65, with the knife block 66, a spring 67 being employed to return the knife and its operating mechanism to normal position. For operating the series of needles automatically we may provide a cam 67× on a shaft 68 acting against an arm 69 of the hand lever 57×, for operating the said lever in one direction and spring 70 returning the hand lever in the opposite direction. For operating the cutting knife a pair of cams may be employed on the shaft 68, only one of, which however, is shown, this being indicated at 71, and operating a lever 72 pivoted at 73, and connected at its front end with the rod or arm 65, which in turn is connected with the knife blade. For operating the shifting comb we employ a cam 74 on the shaft 68, which cam operates a lever 75 pivoted at 76 and having its front end bearing on the end of the shaft 38. The spring 55 returns the shifting bar to normal position.

As before stated, the shifting bar or comb has pivotal movement and this is for the purpose of yieldingly bearing upon the bar 19 of the spool carrying frame, it being noticed from Figs. 6 and 7 that the ends of the teeth 36 are beveled and thus proper guidance of the said teeth will be assured in passing from the position shown in Fig. 6 to that shown in Fig. 7. The pivotal movement of the shifting comb is limited by a stop pin 76× on an arm 78 attached to the shaft 38, said pin engaging one of the arms 40 which support the shifting comb.

Reverting to the action taking place at the spooling machine and to Figs. 1, 2 and 3 it will be noticed that the transfer or alining guide is supported upon a bar 18 which is adapted to slide in a guideway in the comb bracket 9'. By reason of this construction a new alining guide may be placed in position simply by withdrawing the slide bar 18 toward the right Fig. 3 by means of the handle 18× placing the transfer or alining guide in a groove 18' in the upper surface of the said bar and then moving said bar to the left in its guideway so as to carry the alining or transfer guide under the strands of yarn passing from the bobbins to the newly inserted spool. The transfer or alining guide is held accurately in position by bearing against a stop 5' at the end of the carrying bar 18.

It will be seen that by the apparatus above described the relative position of the yarns will be positively and accurately maintained throughout the various steps in the manufacture and no reliance is placed upon the skill, care or attention of the operator such as is necessary in carrying on the work as heretofore practiced, wherein the different color yarns were picked up individually and threaded through the guides of the spool carrying frame. With our invention the yarns as they leave the bobbins are positively maintained in their relative positions throughout all the subsequent steps in the manufacture. It will also be observed that the threading of the guide tubes is accomplished simultaneously and that no separate trimming machine is necessary.

We claim:

1. An alining guide for holding the free ends of the tuft yarns in carpet manufacture, said guide comprising means for clamping the yarns separated and in proper order, substantially as described.

2. An alining guide for holding the free ends of the tuft yarns in carpet manufacture comprising a toothed or comb part and a clamping part removably connected thereto and adapted, when in place, to clamp the yarns separated and in proper order.

3. In apparatus of the class described and in combination with spooling mechanism, means for receiving the yarns before being severed from the bobbin strands to hold said yarns separated and in proper order, said means being transferable with the spool for subsequent operations.

4. In apparatus of the class described and in combination with spooling mechanism, means for receiving the yarns before being severed from the bobbin strands, to hold said yarns separated and in proper order, said means comprising two members, one having notches or guide spaces to receive the yarns and the other being adapted to fit over the said spaces, said means being removable with the spool, substantially as described.

5. In combination, in apparatus of the class described, means for spooling the yarns comprising a comb through which the yarns pass on their way to the spooling rollers, and means supported adjacent the said comb and removable with the spool for receiving the yarns before they are separated from the bobbin strands, said means holding the yarns separated and in proper order, substantially as described.

6. In combination in apparatus of the class described, spooling mechanism, a yarn alining guide arranged between the spool and the bobbin, means for directing the yarns thereover, and for lowering the yarns into the said guiding means before severing the same from the bobbin strands, said guide being removable with the spool to maintain the yarns separated and in proper order.

7. In combination in apparatus of the class described, spooling mechanism, a yarn alining guide, a sliding support therefor by which said guide may be slid into position beneath the yarns and means for placing the yarns before severing from the spool strands within the guide, the said guide with the spool being removable, substantially as described.

8. In combination in apparatus of the class described, a spooling machine comprising the spooling rolls, a fixed comb, a movable guide adapted to engage and hold the yarns separated and in proper order before severing from the bobbins, a sliding support for said guide, an elevated support for directing the yarns above the said guide and means for raising and lowering the said support, substantially as described.

9. In combination in apparatus of the class described, a guide or clamp to hold the free ends of the tuft threads separate and in proper order, and means for threading the said threads through the guide tubes of the spool frame, substantially as described.

10. In combination in apparatus of the class described, a guide or clamp to hold the free ends of the tuft threads separate and in proper order, means for holding the said clamp and the guide tubes of the spool carrying frame in proper relation, and means for threading the yarns simultaneously through the said guide tubes and in the relation maintained by the guide, substantially as described.

11. In combination in apparatus of the class described, a guide or clamp to hold the free ends of the tuft threads separate and in proper order, means for holding the said clamp and the guide tube of the spool carrying frame in proper relation, a series of needles, means for advancing and retracting the said needles through the guide tubes, and a shifting comb for laying the yarns across the stems of the needles, substantially as described.

12. In combination in apparatus of the class described, a guide or clamp to hold the free ends of the tuft threads separate and in proper order, means for holding the said clamp and the guide tube of the spool carrying frame in proper relation, a series of needles, means for advancing and retracting the said needles through the guide tubes, and a shifting comb for laying the yarns across the stems of the needles and a pivoted support for the said shifting comb, substantially as described.

13. In combination in apparatus of the class described, a guide or clamp to hold the free ends of the tuft threads separate and in proper order, means for holding the said clamp and the guide tube of the spool carrying frame in proper relation, a series of needles, means for advancing and retracting the said needles through the guide tubes, and a shifting comb for laying the yarns across the stems of the needles, said shifting comb having its teeth grooved and having a longitudinal groove to receive the hooks of the needles, substantially as described.

14. In combination in apparatus of the class described, the needles, an alining guide to hold the free ends of the tuft threads, means for holding said guide and the guide tubes of the spool frame in proper relation including a registering bar having cavities or seats to receive the ends of the guide tubes, said registering bar also serving to direct the needles to the tubes, and a sliding comb for laying the threads across the stems of the needles, substantially as described.

15. In apparatus of the class described, means for holding the guide tubes of the spool frame, a series of needles, one for each tube, with means for operating the same therethrough and means for engaging the free ends of the threads to be taken simultaneously by the needles and threaded through the tubes.

16. In apparatus of the class described, means for holding the guide tubes of the spool frame, a series of needles, one for each tube, with means for operating the same therethrough and means engaging the free ends of the threads to be taken simultaneously by the needles and threaded through the tubes, said means having a shifting movement to lay the yarns across the stems of the needles, substantially as described.

17. In combination in apparatus of the class described, means for holding the spool frames and guide tubes, means for threading the yarn through the said guide tubes and cutting means for trimming the yarns while the guide tubes are maintained in the threading position, substantially as described.

18. In combination in apparatus of the class described, means for holding the spool frames with the guide tubes in position for threading, a series of needles for threading said tubes simultaneously, and cutting means for trimming the yarns while the tubes are still in the threading machine, substantially as described.

In testimony whereof, we affix our signatures in presence of two witnesses.

EUGENE F. CLARK.
THOS. C. POOLE.

Witnesses:
WILLIAM COPPLEBERGER,
GEORGE E. SMITH.